(12) United States Patent
Finlay

(10) Patent No.: US 11,958,613 B2
(45) Date of Patent: Apr. 16, 2024

(54) ADJUSTABLE SEAT PAN ARTICULATION MECHANISM

(71) Applicant: B/E Aerospace, Inc., Winston-Salem, NC (US)

(72) Inventor: Travis Finlay, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 137 days.

(21) Appl. No.: 17/591,110

(22) Filed: Feb. 2, 2022

(65) Prior Publication Data
US 2023/0242258 A1    Aug. 3, 2023

(51) Int. Cl.
*B64D 11/06* (2006.01)
(52) U.S. Cl.
CPC .................. *B64D 11/064* (2014.12)
(58) Field of Classification Search
CPC .................................................. B64D 11/064
See application file for complete search history.

(56) References Cited

U.S. PATENT DOCUMENTS

| | | | |
|---|---|---|---|
| 8,616,646 B2 | 12/2013 | Deegener et al. | |
| 10,167,083 B2 | 1/2019 | Henshaw | |
| 10,850,648 B2 | 12/2020 | Finlay et al. | |
| 2020/0307801 A1 | 10/2020 | Reichel et al. | |

FOREIGN PATENT DOCUMENTS

| | | | | |
|---|---|---|---|---|
| DE | 4400911 A1 | 8/1994 | | |
| EP | 3715253 A1 | 9/2020 | | |
| FR | 3001782 A1 | * 8/2014 | ........... | B64D 11/064 |
| WO | 1999005000 A1 | 2/1999 | | |
| WO | 2003089299 A1 | 10/2003 | | |

OTHER PUBLICATIONS

Extended European Search Report dated Jun. 5, 2023; European Application No. 23152951.2.

* cited by examiner

*Primary Examiner* — Anthony D Barfield
(74) *Attorney, Agent, or Firm* — Suiter Swantz pc llo

(57) ABSTRACT

A clockable articulation insert for a seat is disclosed. The clockable articulation insert includes a base portion that inserts into a cavity within the frame or spreader bar of the seat. The clockable articulation insert further includes a face that comprises a guide slot that couples to a cross piece of the seat that is itself coupled to a seat pan. Movement of the cross piece within the guide slot changes the tilt, extension, and/or rake of the seat pan. Clocking the clockable articulation insert to a different position alters the articulation profile of the clockable articulation insert, resulting in a different set of ranges of tilt, extension, and/or rake that can be accomplished by sliding the cross piece within the guide slot. The set of articulation profiles may be further changed by replacing the clockable articulation insert with another clockable articulation insert configured with a differently designed guide slot.

14 Claims, 9 Drawing Sheets

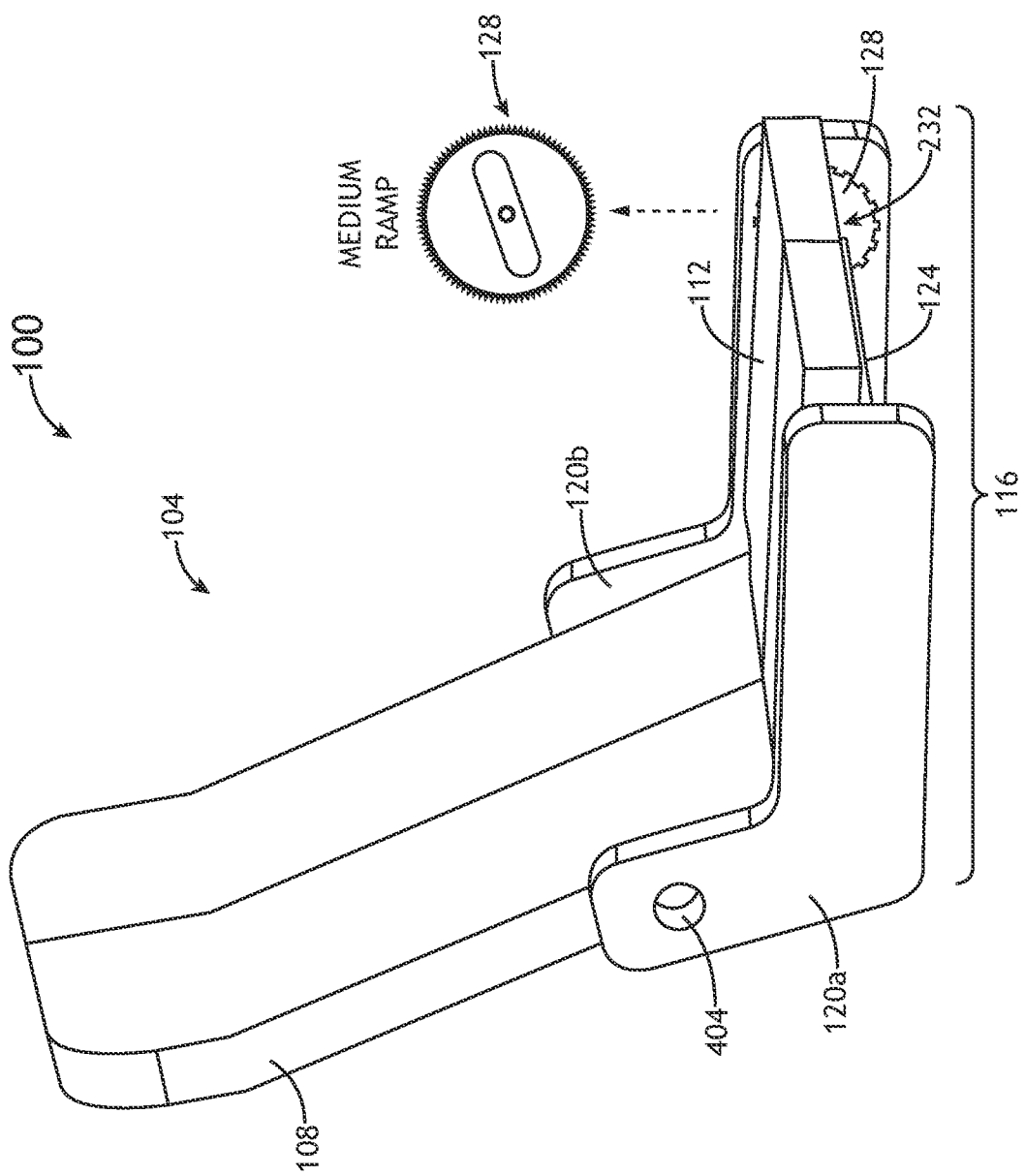

ADJUSTABLE SEAT PAN ARTICULATION MECHANISM

BACKGROUND

Seat articulation profiles aboard commercial aircraft are implemented via articulation inserts that involve fixed parts of the seat design that are not ideal for all installations of the seat, particularly for passengers or customers with different seat articulation profile preferences. For example, a first passenger may prefer that the seat pan tilt upward when reclining, raising the knee slightly, whereas a second passenger may prefer the seat pan remain essentially level and extending slightly forward when reclining. Differences in the tilt of the seat pan may also alter the overall dimensions of the passenger seat, which may affect the total amount of seating than can be placed within an aircraft cabin. Adjustment or customization of seat articulation profiles often require swapping out entire seats or articulation inserts, which can incur high costs for parts and labor. Therefore, it is desirable to provide a system or apparatus that avoids the shortcomings of conventional approaches.

SUMMARY

A system is disclosed. In one or more embodiments, the system includes a first clockable articulation insert for a seat. In one or more embodiments, the seat includes a seat pan. In one or more embodiments, the seat further includes a cross piece coupled to the seat pan. In one or more embodiments, the seat further includes a seat frame. In one or more embodiments, the seat frame includes two spreader bars each configured to receive the first clockable articulation insert. In one or more embodiments, the first clockable articulation insert includes a base portion. In one or more embodiments the base portion is configured to insert within a cavity of each of the spreader bars at two or more rotated positions. In one or more embodiments, the base portion includes an outer wall configured to physically engage with side walls of the cavity. In one or more embodiments, the base portion is configured to restrict rotation between the base and the cavity. In one or more embodiments, the first clockable articulation insert further includes a face portion. In one or more embodiments, the face includes a guide slot. In one or more embodiments, the guide slot is configured to receive a terminal end of the cross piece. In one or more embodiments, a movement of the cross piece is guided by the guide slot. In one or more embodiments, a rake, a tilt or a translation of the seat pan relative to the seat frame is determined by the position of the terminal end of the cross piece within the guide slot. In one or more embodiments, an articulation profile is determined by a rotated position of the base portion. In one or more embodiments, the articulation profile includes at least one of a range of tilt, a range of rake, or a range of extension of the seat pan relative to the seat frame. In one or more embodiments, the first clockable articulation insert further includes a first articulation profile set that includes a set of articulation profiles In some embodiments of the system, the system further includes the seat.

In some embodiments of the system, the system further includes a second clockable articulation insert configured with a second articulation profile set. In some embodiments of the system, the second clockable articulation insert is configured to replace the first clockable articulation insert.

In some embodiments of the system, the system further includes a seatback mechanically coupled to the seat pan. In some embodiments of the system, a position of the seatback is determined by the position of the terminal end of the cross piece within the guide slot.

In some embodiments of the system, the cavity is rotatable.

In some embodiments of the system the outer walls are configured as a gear.

In some embodiments of the system, the outer walls are configured as a polygon having three or more sides.

In some embodiments of the system, the second clockable articulation insert is configured with a guide slot that does not cross a center of the face portion.

In some embodiments of the system, the seatback includes a back pivot.

In some embodiments of the system, the back pivot is configured to receive a third clockable articulation insert.

A method for modifying an articulation profile of a seat is also disclosed. In one or more embodiments, the method comprises decoupling a cross piece from a guide slot of a first clockable articulation insert. In one or more embodiments, the first clockable articulation insert configured in a first rotated position within a cavity of a spreader bar. In one or more embodiments, the cross piece is coupled to a seat pan. In one or more embodiments, the method further includes removing the first clockable articulation insert from the cavity. In one or more embodiments, the method further includes inserting at least one of the first clockable articulation insert or a second clockable articulation insert into the cavity. In one or more embodiments, the first clockable articulation insert is configured in a second rotated position. In one or more embodiments, the method includes coupling the cross piece to the guide slot.

In some embodiments of the method, the first clockable articulation insert is configured with a first articulation profile set.

In some embodiments of the method, the seat further includes a seat pan coupled to the cross piece. In some embodiments of the method, the insertion of at least one of the first clockable articulation insert into the cavity or the second clockable articulation insert into the cavity changes the articulation profile of the seat.

In some embodiments of the method, wherein the seat further includes a seatback coupled to the seat pan. In some embodiments, the insertion of at least one of the first clockable articulation insert into the cavity or the second clockable articulation insert into the cavity changes an articulation profile of the seatback.

In some embodiments of the method, the method further includes unlocking the first clockable articulation insert.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5B is a drawing illustrating the passenger seat configured with the clockable articulation insert set at medium ramp, and the cross piece positioned at a low position of the guide slot, in accordance with one or more embodiments of the disclosure;

DETAILED DESCRIPTION

Figure 1:
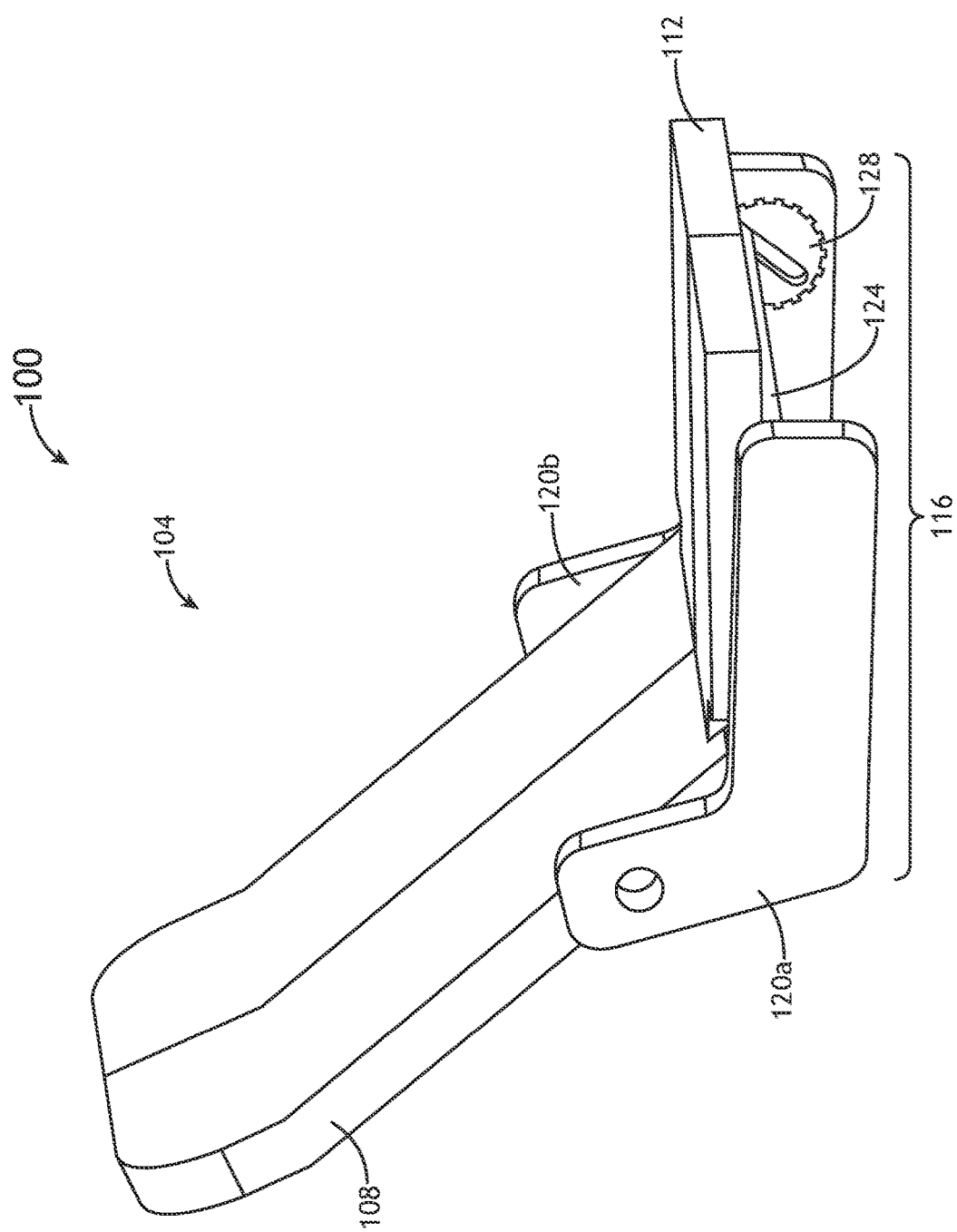
FIG. 1 is a drawing illustrating of system for adjusting the articulation of a passenger seat 104, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A clockable articulation insert for adjusting the articulation profile of a seat, such as the seat pan of a passenger seat, is disclosed. The clockable articulation insert fits into a cavity of a seat frame or seat frame portion, such as a spreader bar (e.g., the spreader bar receives the clockable articulation insert). A guide slot on the clockable articulation insert accepts an end of a cross piece that is coupled to the seat pan. As the cross piece slides within the guide slot, the tilt, extension, and/or rake (e.g., height) of the seat pan is adjusted. By removing, and then replacing, the clockable articulation insert at a different position (e.g., clocking the clockable articulation insert), the different range of tilt, extension and/or rake is possible for the seat pan. Separate clockable articulation inserts with differently configured guide slots can be switched into the seat frame, allowing a passenger seat to have several different articulation profiles without substantial replacement of parts or labor inputs.

FIG. 1 is a drawing illustrating of system 100 for adjusting the articulation of a passenger seat 104, in accordance with one or more embodiments of this disclosure. The passenger seat may include a seatback 108, a seat pan 112, a seat frame 116 coupled to the seatback 108 and the seat pan 112. The seat frame 116 may further comprise spreader bars 120a-b. The seat pan 112 rests upon, and/or is coupled to, a cross piece 124, which is subsequently coupled to the spreader bars 120a-b via a clockable articulation insert 128 removable inserted into the spreader bars 120a-b.

It is to be understood that the clockable articulation insert 128 is typically used as a pair when implemented (e.g., two clockable articulation inserts 128 per seat). For purposes of clarity, only one clockable articulation insert 128 is shown per seat in the figures. Although the clockable articulation insert 128 may be described within this disclosure as a singular device within the system 100, the system 100 may include two or more clockable articulation inserts 128. Therefore, the description herein should not be interpreted as a limitation on the number of clockable articulation inserts 128 within the system 100 but merely as an illustration.

It is to be understood that the system 100 may include only the clockable articulation insert 128 or may further include any or all components of the passenger seat 104 including but not limited to the cross piece 14, the seat frame 116, the spreader bars 120*a-b*, the seat pan 112, and the seatback. Therefore, the description herein should not be interpreted as limitation on the components included within the system 100 along with the clockable articulation insert 128, but merely as an illustration.

Figure 2:
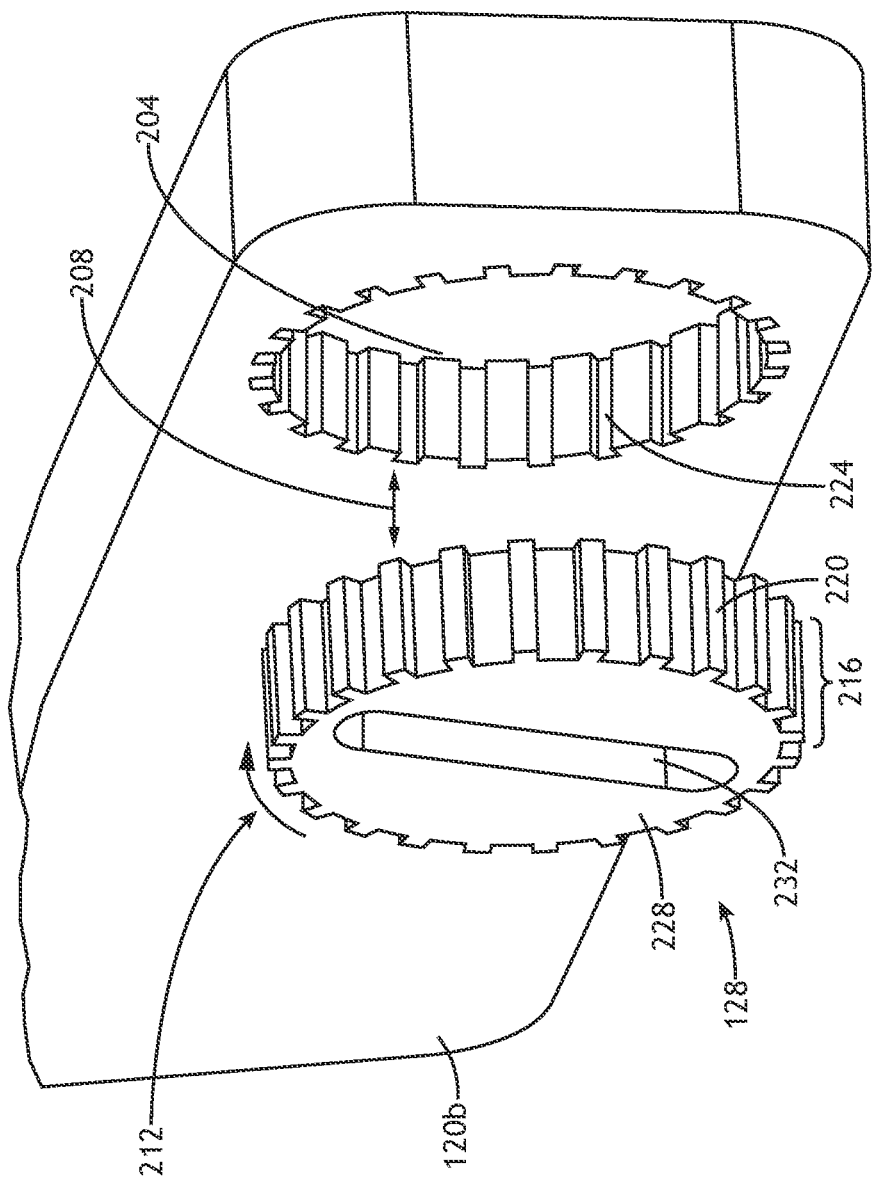
FIG. 2 is a drawing of a close-up perspective view of the clockable articulation insert and the spreader bar, in accordance with one or more embodiments of the disclosure.

FIG. 2 is a drawing of a close-up perspective view of the clockable articulation insert 128 and the spreader bar 120*b*, in accordance with one or more embodiments of the disclosure. The clockable articulation insert 128 may be comprised of any substance (e.g., metal, plastic, wood) and may take any shape that is clockable to two or more positions. The term "clockable" refers to the ability of the clockable articulation insert 128 to be inserted into a cavity 204 of the spreader bar 120*b* at different orientations or rotations of the clockable articulation insert 128. For example, and as shown in FIG. 2, the clockable articulation insert 128 may fit into the cavity 204 by a lateral movement 208. The clockable articulation insert 128 may also be rotated 212, or clocked, so that the clockable articulation insert 128 may be inserted via the lateral movement 208 into the spreader bar 120*b* at a different position (e.g., different clocked position).

The clockable articulation insert 128 includes a base portion 216 that inserts into the cavity 204. The base portion 216 includes a perimeter 220 (e.g., outer wall) that interacts with (e.g., physically engages with) side walls 224 of the cavity 204. Once inserted into the cavity 204, rotation 212 of the clockable articulation insert 128 relative to the side walls 224 is not possible. The perimeter 220 may be configured with any type of shape or structure that permits the clocking of two or more clocked positions when inserted into the cavity 204. For example, the perimeter 220 may be configured with a gear or gear-like surface that is insertable to a cavity 204 with gear-like side walls 224 and capable of over 20 clocked positions (as shown in FIG. 2). In another example, the perimeter 220 may be configured as a polygon, such as octagon that inserts into an octagon-shaped cavity 204 (e.g., capable of eights clocked positions). In another example, the perimeter 220 may be configured as a circle that is lockable via a friction lock or other mechanism within a circular cavity, which may be capable of infinite positions. The clockable articulation insert 128 may be configured to orientate any number of clockable positions including but not limited to two positions, four positions, eight positions, 16 positions, 32 positions, 64 positions, 128 positions, 256 positions, or infinite positions.

The clockable articulation insert 128 further includes a face portion 228 that remains exposed after the base portion 216 is inserted into the cavity 204. The face portion 228 includes a guide slot 232 that accepts the end of the cross piece 124. The guide slot 232 may be configured of any size, width, length, or depth. The guide slot 232 may also be configured on or off center (e.g., the guide slot 232 does not cross the center of the face portion 228, as further described below. The guide slot 232 may be configured with any type of profile including but not limited to a straight profile (e.g., as shown in FIG. 2), a curved profile, or a profile having a series of curves.

Figure 3:
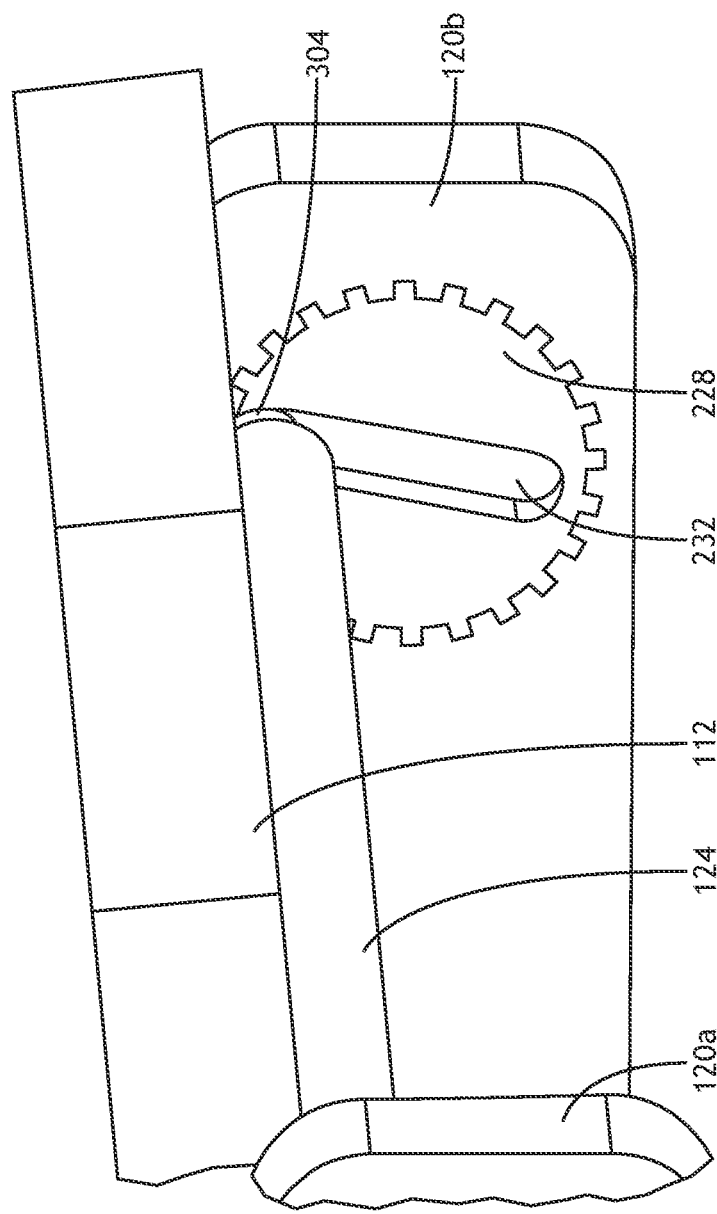
FIG. 3 is a drawing of a close-up perspective view of the clockable articulation insert inserted into the cavity of the spreader bar, in accordance with one or more embodiments of the disclosure.

FIG. 3 is a drawing of a close-up perspective view of the clockable articulation insert 128 inserted into the cavity 204 of the spreader bar 120*b*, in accordance with one or more embodiments of the disclosure. A terminal end 304 of the cross piece 124 is inserted into the guide slot 232 of the clockable articulation insert 128. The terminal end 304 may be configured as any insertable element that can move along the profile of the guide slot 232 including but not limited to a simple dowel (e.g., a simple dowel or rod with a smaller diameter as the rest of the cross piece 124 as shown in FIG. 3), a roller (e.g., rotating via a roller bearing), or a cam follower. Accordingly, the guide slot 232 may be configured to accepts any type of terminal end 304. As shown in FIG. 3, movement of the cross piece 124 along the guide slot 232 changes the height and extension (e.g., translation) of the cross piece 124 relative to the spreader bar 120*b* and/or seat frame 116. The change in height of the cross piece 124 also changes the tilt of the seat pan 112 and may also change an extension of the seat pan 112 (e.g., a change in the lateral position of the seat pan 112 relative to the seat frame 116) if the seat pan 112 is firmly attached to the cross piece 124. Clocking the clockable articulation insert 128 changes the slope of the guide slot 232, which in turn changes the range that the cross piece 124 may be raised/lowered and extended/retracted.

The cross piece 124 may be configured as any type of structure with terminal ends 304 that are insertable into the guide slot 232 of the clockable articulation inserts 128. For example, the cross piece 124 may be configured as a cross bar that spans the gap between each pair of clockable inserts 128, the seat pan 112 resting on, coupled to, or integrated with, the cross bar. In another example, the cross piece 124 may be integrated within the seat pan 112 or frame of the seat pan 112. For example, the cross piece 124 may be configured as two elements that extend from the seat pan 112 or seat frame 116, with each element configured with a terminal end 304 insertable into the guide slot 232 of the clockable articulation insert 128. Therefore, the description herein should not be interpreted as a limitation of the clockable articulation inserts 128 or the system 100 but merely as an illustration.

Figure 4:
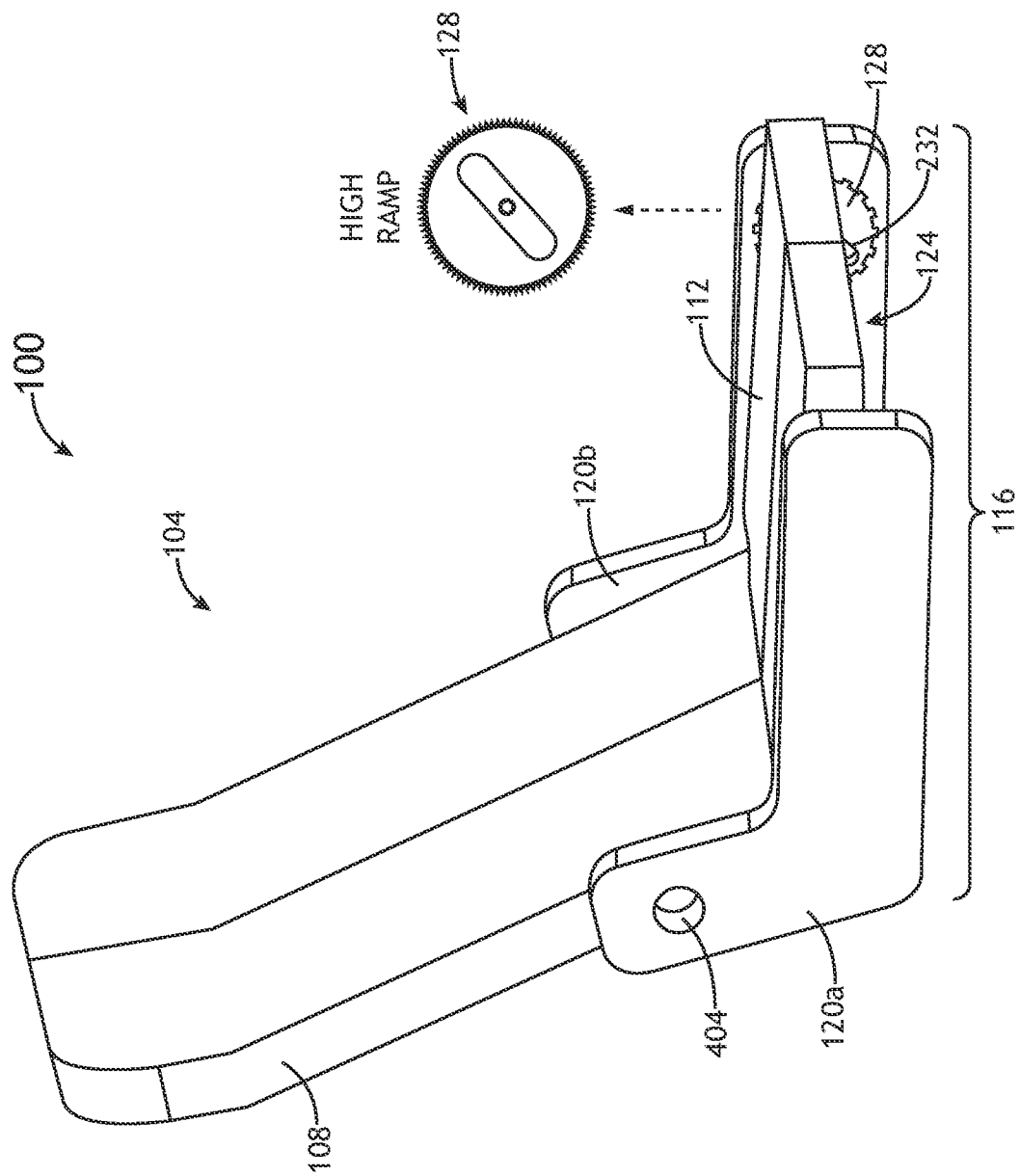
FIG. 4 is a drawing illustrating a perspective view of the passenger seat configured with the clockable articulation insert set at high ramp, and the cross piece positioned at a low position of the guide slot, in accordance with one or more embodiments of the disclosure.

FIG. 4 is a drawing illustrating the passenger seat 104 configured with the clockable articulation insert 128 set at high ramp (e.g., the slope of the guide slot 232 close to vertical, as shown in the inset), and the cross piece 124 positioned at a low position of the guide slot 232, in accordance with one or more embodiments of the disclosure. Both the cross piece 124 and the guide slot 232 are barely visible, as the seat pan 112 is nominally titled, obscuring from view the cross piece 124 and the guide slot. In contrast, FIG. 1 presents the passenger seat 104 with the clockable articulation insert 128 clocked in the same position (e.g., high ramp), but with the cross piece 124 positioned at the high position of the guide slot (e.g., the cross piece 124 and the guide slot 232 not obscured from view due to the tilting of the seat pan 112.

In some embodiments, the movement of the cross piece 124 along the guide slot 232 changes the tilt (e.g., recline profile) of the seatback. For example, the seatback may be mechanically coupled to the seat pan, and also may also be configured to pivot along a back pivot 404. In this configuration, the movement of the cross piece 124 along the guide slot 232 tilts and extends/retracts the seat pan 112 to a different position, which then cause a resultant change in the recline profile of the seatback. Multiple configurations and/or mechanisms of coupling between the cross piece 124, the seat pan 112, and the seatback 108 are possible, with the movement of the cross piece 124 affecting the tilt and/or position of the seat pan 112 and/or the seatback 108.

Figure 5A:
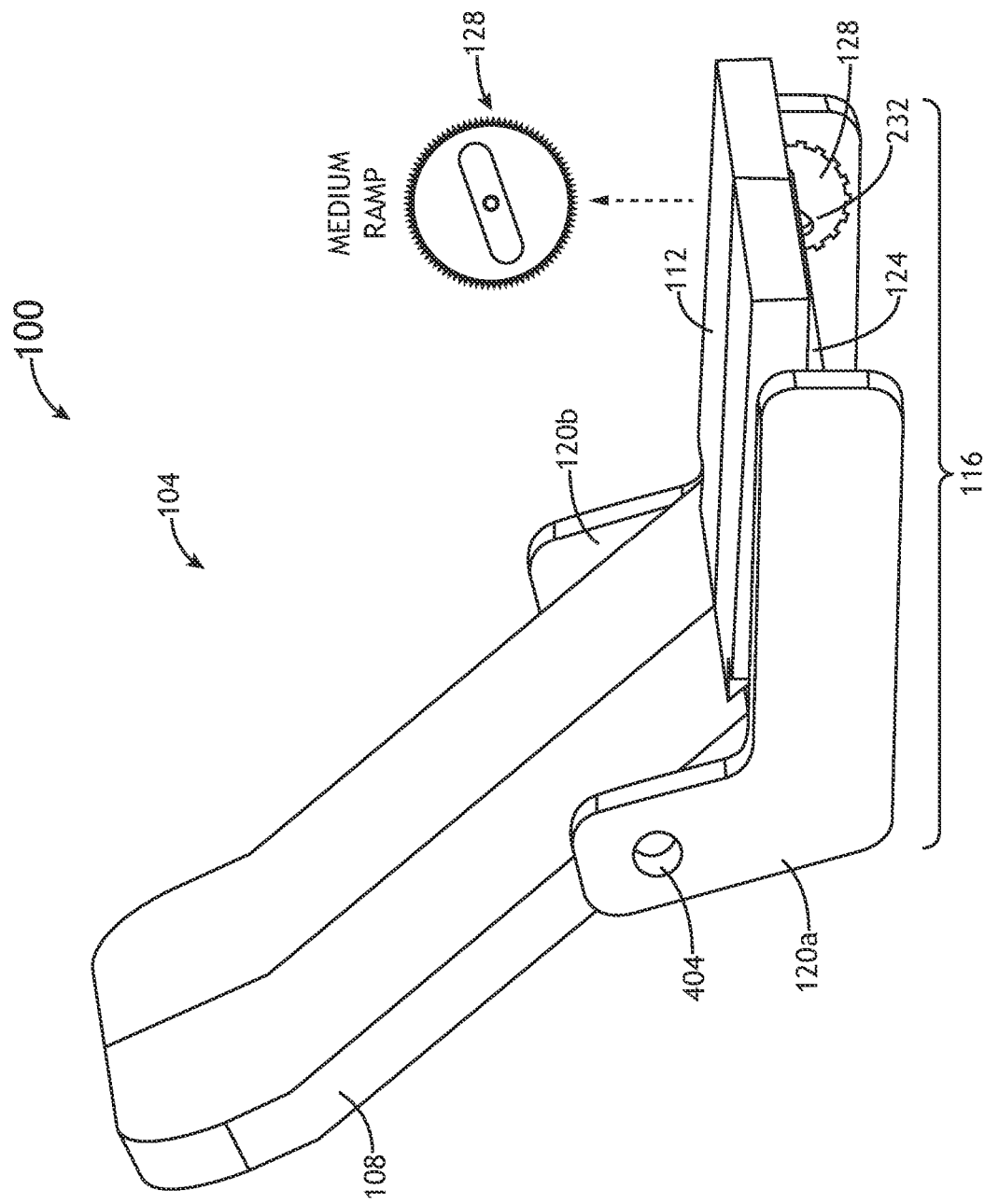
FIG. 5A is a is a drawing illustrating a perspective view of the passenger seat 104 configured with the clockable articulation insert set at medium ramp, and the cross piece positioned at a high position of the guide slot, in accordance with one or more embodiments of the disclosure.

FIG. 5A is a is a drawing illustrating the passenger seat 104 configured with the clockable articulation insert 128 set at medium ramp (e.g., the slope of the guide slot 232 closer to horizontal than high ramp, as shown in the inset), and the cross piece 124 positioned at a high position of the guide slot 232, in accordance with one or more embodiments of the disclosure. The change from a high ramp position to a medium ramp position may be carried out by removing the clockable articulation insert 128 from the cavity 204, rotating 212 the clockable articulation insert 128 to the medium ramp position, and inserting the clockable articulation insert 128 back into the cavity 204. The medium ramp configuration of the clockable articulation insert results in a lessened ability to tilt the seat pan upwards, and there is a corresponding increase in the ability of the seat pan to extend, resulting in an increased recline profile as that seen in the high ramp configuration.

FIG. 5B is a drawing illustrating the passenger seat 104 configured with the clockable articulation insert 128 set at medium ramp (e.g., the slope of the guide slot 232 closer to horizontal than high ramp, as shown in the inset), and the cross piece 124 positioned at a low position of the guide slot 232, in accordance with one or more embodiments of the disclosure. As shown in FIG. 4, the positioning of the cross piece 124 at the low position of the guide slot 232 reduced the tilt of the seat pan 112, and further reduces the extension of the seat pan as well as the recline profile of the seatback 108.

The ability of the clockable articulation insert 128 to clock to multiple positions allows the passenger seat 104 to be quickly set to different seat profiles if needed. For example, for economy seating, where the space between each row of passenger seats 104 is minimized, the clockable articulation insert 128 may be clocked to a high ramp setting, which reduces the maximal extension of the seat pan 112 and may reduce the maximal recline of the seatback 108 as compared to the medium ramp setting. In another example, for business class seat or luxury class seating, where the space between each row of passenger seats 104 is not minimized, the clockable articulation insert 128 may be clocked to a medium ramp setting, which increases the maximal overall extension of the seat pan 112 and may increase the maximal recline of the seatback as compared to the high ramp setting.

Figure 6A:
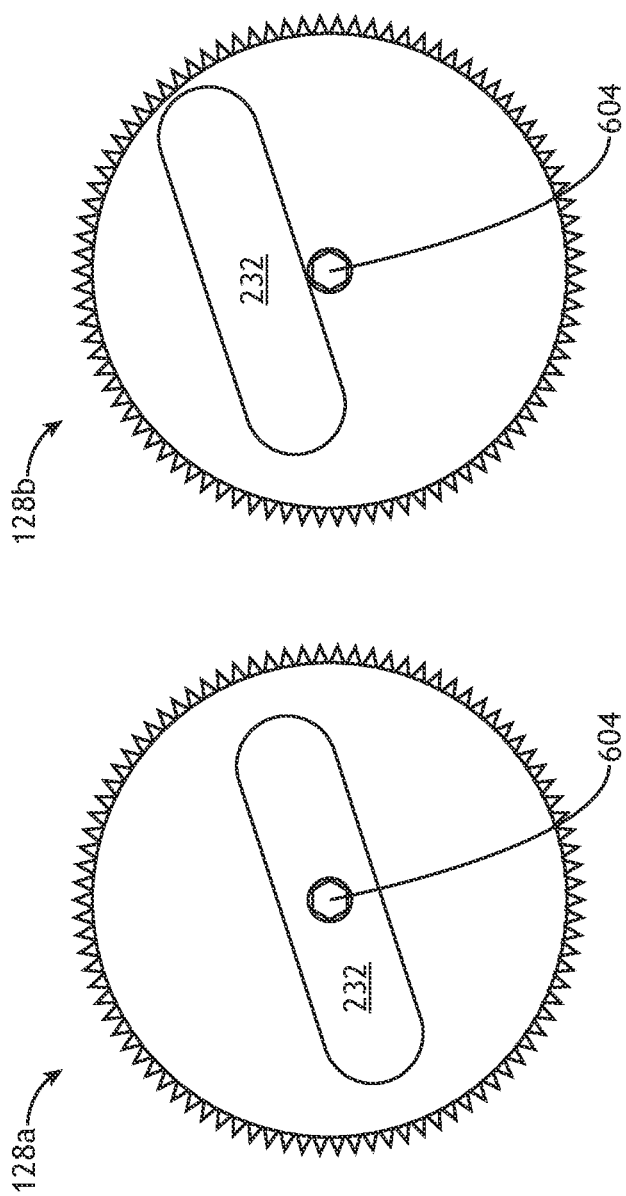
FIG. 6A is a drawing illustrating a first clockable articulation insert configured to change the tilt profile and extension profile of the passenger seat and a second clockable articulation insert configured to change the tilt profile, extension profile, and rake profile of the passenger seat, in accordance with one or more embodiments of this disclosure.

FIG. 6A is a drawing illustrating a clockable articulation insert 128a configured to change the tilt profile and extension profiles of the passenger seat 104 and a clockable articulation insert 128b (e.g., a second clockable articulation insert 128b) configured to change the tilt profile, extension profile, and rake profile of the passenger seat 104, in accordance with one or more embodiments of this disclosure. By offsetting the guide slot 232 from center 604, clocking the second clockable articulation insert also alters the rake, or seat pan height. For example, as shown in FIG. 6, the second clockable articulation insert 128b is shown in the high rake position, as a cross piece 124 inserted into the guide slot 232 would have an overall higher range of height as a cross piece 124 inserted into the guide slot 232 of the original clockable articulation insert 128a.

It is to be understood that each clockable articulation insert 128 may be insertable in two or more rotated positions, and that each rotated position constitutes an articulation profile that allows the passenger seat 104 to attain different positions based on the position of the cross piece 124 relative to the guide slot 232, as the sliding of a cross piece 124 along the guide slot 232 results in a specific position of the passenger seat 104 (e.g., seat pan 112) within the articulation profile. Because each clockable articulation insert 128a-b may each be designed with different guide slots 232, differently designed clockable articulation inserts 128a-b may also have different articulation profile sets (e.g., each set includes different group of articulation profiles). For example, two octagon-shaped clockable articulation inserts 128 configured with differently designed guide slots 232, and therefore different articulation profile sets, may each be configured with a set of eight articulation profiles based on the clocked position, with no similar articulation profile existing between the two octagon-shaped clockable articulation inserts 128. In this manner, a seat pan position may be dependent on a specific position of a cross piece 124 within a guide slot 232, for which the position of the guide slot 232 is dependent on the rotated position of the clockable articulation insert 128 (e.g., the articulation profile), which is further dependent on the specific clockable articulation insert 128a-b used (e.g., the articulation profile set). This hierarchy of settings enables a nearly unlimited number of possible recline settings for a passenger seat.

Figure 6B:
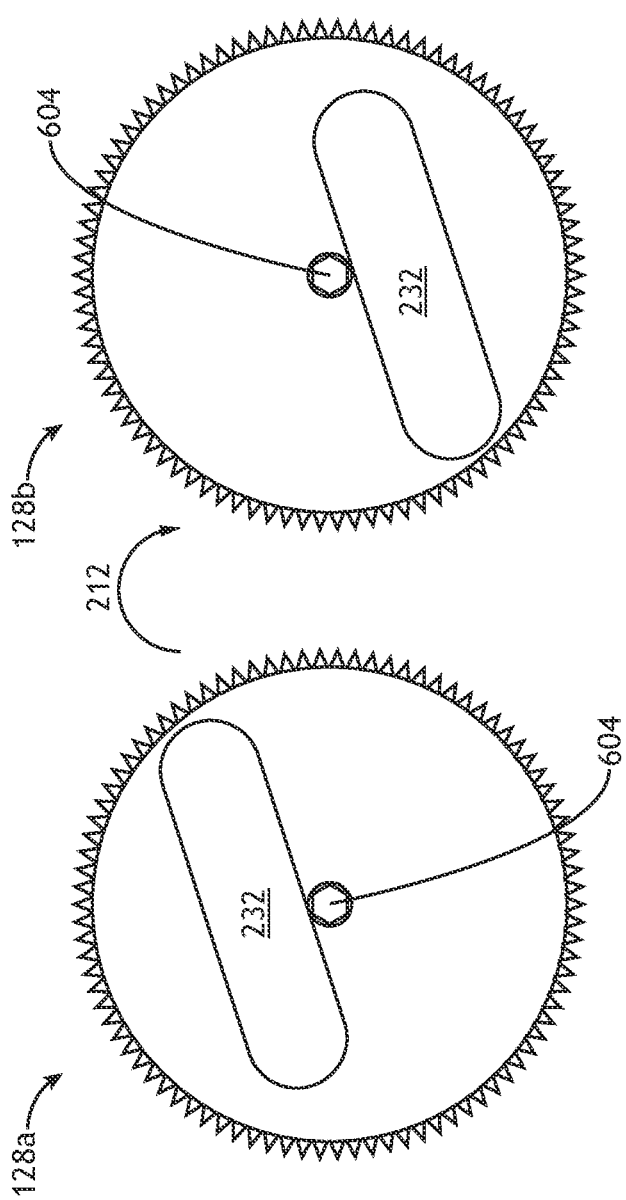
FIG. 6B is a drawing illustrating the second clockable articulation insert 128b clocked from a first position to a second position, in accordance with one or more embodiments of the disclosure.

FIG. 6B is a drawing illustrating the second clockable articulation insert 128b clocked (e.g., rotated 212) from a first position (e.g., high rake) to a second position (e.g., low rake), in accordance with one or more embodiments of the disclosure. A cross piece 124 inserted into the guide slot 232 at the high rake position would produce a seat pan with a considerably higher rake than a cross piece 124 inserted into the guide slot 232 at the low rake position. Importantly, small changes in the rotation 212 of the second clockable articulation insert would still allow changes in the range of tilt and/or extension to be made while still maintaining the approximate high rake or low rake characteristic.

Figure 7:
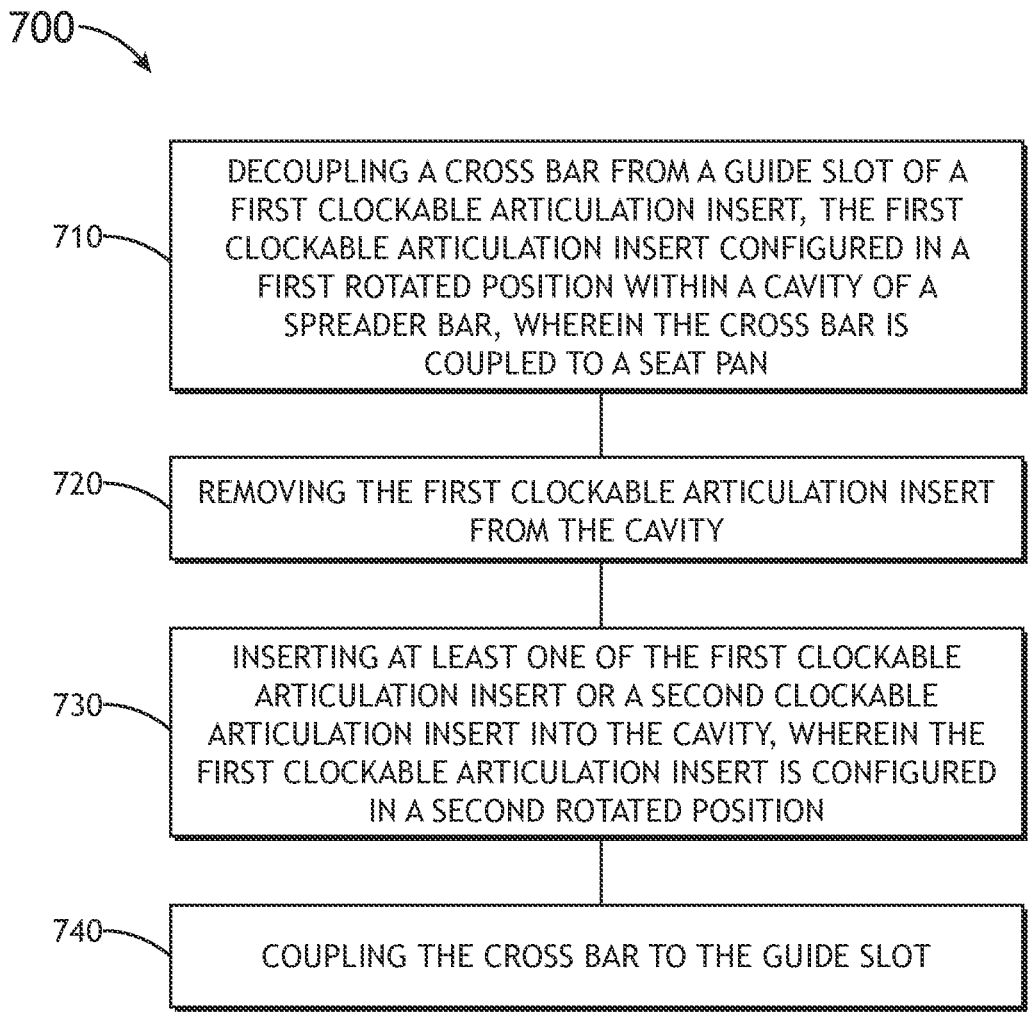
FIG. 7 is a block diagram illustrating a method for modifying the articulation profile of a seat, in accordance with one or more embodiments of the disclosure.

FIG. 7 is a block diagram illustrating a method 700 for modifying the articulation profile of a seat (e.g., a passenger seat 104), in accordance with one or more embodiments of the disclosure. The articulation profile of the seat may include the range of tilt of the seat pan 112, the range of extension of the seat pan 112 (e.g., extending towards, and/or retracting from, the front of an aircraft cabin, and/or the rake, or range of rake of the seat pan. The articulation profile of the seat may also include the position of the seatback. For example, the method 700 may be utilized to change the articulation profile of an economy passenger seat, limited to a narrow range of recline motion, to a business class passenger seat, having a greater range of recline motion than the economy passenger seat. Method 700 may be performed at specific times of cabin construction/modification or flight. For example, the method 700 may be performed during the initial installation of the passenger seat 104 into the cabin. In another example, the method 700 may be performed during cabin remodeling. In another example, the method 700 may be performed between flight. In another example, the method 700 may be performed during flight.

In one or more embodiments, the method 700 includes a step 710 of decoupling a cross piece 124 from a guide slot 232 of a first clockable articulation insert 128a, the first clockable articulation insert 128a configured in a first rotated position within the cavity 204 of a spreader bar 120a-b. The cross piece 124 may block or otherwise prevent the first clockable articulation insert 128 from easy retrieval from the cavity 204. Removal of the cross piece 124 (e.g., via any typical method) allows access to the first clockable articulation insert 128a.

In one or more embodiments, the method 700 includes a step 720 of removing the first clockable articulation insert 128a from the cavity 204. Removal of the first clockable articulation insert 128a may include holding on to the face portion 228 and pulling on the first clockable articulation insert 128a via a lateral movement 208. The step 720 may also include unlocking the first clockable articulation insert 128a from the cavity 204, which may include but be limited to removal of a retention screw or unlocking a locking tab.

In one or more embodiments, the method 700 includes a step 730 of inserting at least one of the first clockable articulation insert 128a into the cavity 204, wherein the first clockable articulation insert 128a is configured in a second rotated position, or a second clockable articulation insert 128b into the cavity. For example, the first clockable articulation insert 128a, once removed, may be rotated 212, to a second position, and inserted back into the cavity, thereby altering the articulation profile of the passenger seat 104. In another example, the first clockable articulation insert 128a (e.g., configured with a first articulation profile set) may be swapped with the second clockable articulation insert 128b (e.g., configured with a second articulation profile set), which is then inserted into the cavity 204, thereby altering the articulation profile of the passenger seat 104. In some embodiments, the first clockable articulation insert 128a or the second clockable articulation insert 128b may be locked into place via a mechanical device such as a retention screw or a locking tab.

In some embodiments, the method 700 includes a step 740 of coupling the cross piece 124 to the guide slot 232. The coupling of the cross piece 124 may be accomplished via any typical method, and may be related to the step 710 of removing the cross piece. Coupling the cross piece 124 to the guide slot 232 concludes the process modifying the articulation profile of the passenger seat 104.

In one or more embodiments, the cavity 204 is rotatable. For example, the cavity 204 may be rotated manually or automatically via a motor in order to change the articulation profile, which may then be locked into place. In this manner, the articulation profile of the passenger seat 104 may be changeable without the need to remove and replace the clockable articulation insert 128a-b.

In some embodiments, clockable articulation inserts 128 may be utilized within other sections of the passenger seat 104. For example, clockable articulation inserts 128 may be configured for use at the back pivot 404 of the seatback 108 and/or an articulatable head rest. For instance, the implementation of clockable articulation inserts (e.g., third and fourth clockable articulation inserts 128) at the back pivot 404 or other joints in the passenger seat 104 may increase the number of possible positions by the chair, increasing comfort. In this manner, the passenger seat 104 may use multiple sets of clockable articulation inserts for multiple joints within the passenger seat.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
a first clockable articulation insert for a seat, wherein the first clockable articulation insert is configured to be rotated and removably inserted into any particular rotated position of two or more rotated positions, wherein the seat comprises:
a seat pan;
a cross piece coupled to the seat pan, the cross piece configured with two terminal ends; and
a seat frame comprising two spreader bars each configured to receive the first clockable articulation insert, wherein the first clockable articulation insert comprises comprising:
a base portion configured to insert within a cavity of each of the spreader bars at the two or more rotated positions, the base portion comprising an outer wall configured to physically engage with side walls of the cavity and configured to restrict rotation between the base and the cavity; and
a face portion comprising a guide slot configured to receive a terminal end of the cross piece, p2 wherein the guide slot is configured to guide a movement of the cross piece, wherein the movement comprises a rake, a tilt, or a translation of the seat pan relative to the seat frame and is determined by the position of the terminal end of the cross piece within the guide slot, wherein an articulation profile is determined by a rotated position of the base portion, wherein the articulation profile includes at least one of a range of tilt, a range of rake, or a range of extension of the seat pan relative to the seat frame; and
wherein the two or more rotated positions determine a first articulation profile set that comprises a set of articulation profiles,
wherein the outer walls are configured as a polygon having three or more sides.

2. The system of claim 1, further comprising the seat.

3. The system of claim 2, further comprising a second clockable articulation insert configured with a second articulation profile set, wherein the second clockable articulation insert is configured to replace the first clockable articulation insert.

4. The system of claim 3, wherein the second clockable articulation insert is configured with a guide slot that does not cross a center of the face portion.

5. The system of claim 2, further comprising a seatback mechanically coupled to the seat pan, wherein a position of the seatback is determined by the position of the terminal end of the cross piece within the guide slot.

6. The system of claim 5, wherein the seatback comprises a back pivot.

7. The system of claim 6, wherein the back pivot is configured to receive a third clockable articulation insert.

8. The system of claim 1, wherein the cavity is rotatable.

9. The system of claim 1, wherein the outer walls are configured as a gear.

10. A method for modifying an articulation profile of a seat comprising:
decoupling a cross piece from a guide slot of a first clockable articulation insert, the first clockable articulation insert configured in a first rotated position within a cavity of a spreader bar of a seat frame, wherein the first clockable articulation insert is configured to be rotated and removably inserted into any particular rotated position of two or more rotated positions, wherein the cross piece is coupled to a seat pan,
wherein the first clockable articulation insert comprises:
  a base portion configured to insert within the cavity of the spreader bar at the two or more rotated positions, the base portion comprising an outer wall configured to physically engage with side walls of the cavity and configured to restrict rotation between the base and the cavity; and
  a face portion comprising the guide slot configured to receive a terminal end of the cross piece,
  wherein the guide slot is configured to guide a movement of the cross piece, wherein the movement comprises a rake, a tilt, or a translation of the seat pan relative to the seat frame and is determined by the position of the terminal end of the cross piece within the guide slot, wherein an articulation profile is determined by a rotated position of the base portion, wherein the articulation profile includes at least one of a range of tilt, a range of rake, or a range of extension of the seat pan relative to the seat frame,
  wherein the outer walls are configured as a polygon having three or more sides;
removing the first clockable articulation insert from the cavity;
inserting at least one of the first clockable articulation insert or a second clockable articulation insert into the cavity, wherein the first clockable articulation insert is configured in a second rotated position; and
coupling the cross piece to the guide slot.

11. The method of claim 10, wherein the first clockable articulation insert is configured with a first articulation profile set.

12. The method of claim 10, wherein the seat further includes the seat pan coupled to the cross piece, wherein the insertion of at least one of the first clockable articulation insert into the cavity or the second clockable articulation insert into the cavity changes the articulation profile of the seat.

13. The method of claim 12, wherein the seat further includes a seatback coupled to the seat pan, wherein the insertion of at least one of the first clockable articulation insert into the cavity or the second clockable articulation insert into the cavity changes an articulation profile of the seatback.

14. The method of claim 10, further comprising unlocking the first clockable articulation insert.

* * * * *